(12) United States Patent
De Vos

(10) Patent No.: US 8,661,774 B2
(45) Date of Patent: Mar. 4, 2014

(54) DEVICE FOR PACKAGING PRODUCTS

(75) Inventor: Adrianus De Vos, 'S-Gravendeel (NL)

(73) Assignee: Visser 'S-Gravendeel Holding B.V., 's-gravendeel (NL)

( * ) Notice: Subject to any disclaimer, the term of this patent is extended or adjusted under 35 U.S.C. 154(b) by 376 days.

(21) Appl. No.: 12/865,368

(22) PCT Filed: Feb. 13, 2009

(86) PCT No.: PCT/NL2009/050063
§ 371 (c)(1),
(2), (4) Date: Nov. 8, 2010

(87) PCT Pub. No.: WO2009/102203
PCT Pub. Date: Aug. 20, 2009

(65) Prior Publication Data
US 2011/0036061 A1    Feb. 17, 2011

(30) Foreign Application Priority Data
Feb. 15, 2008   (NL) .................................. 1035027

(51) Int. Cl.
*B65B 1/32*   (2006.01)

(52) U.S. Cl.
USPC ....................... 53/502; 53/52; 53/154; 53/493

(58) Field of Classification Search
USPC .............................. 53/52, 502, 493, 445, 154
See application file for complete search history.

(56) References Cited

U.S. PATENT DOCUMENTS

| | | | | |
|---|---|---|---|---|
| 3,822,527 A | * | 7/1974 | Germunson et al. | 53/572 |
| 5,406,770 A | * | 4/1995 | Fikacek | 53/54 |
| 6,000,200 A | | 12/1999 | Germunson et al. | |
| 6,125,615 A | * | 10/2000 | Germunson et al. | 53/469 |
| 7,240,465 B2 | * | 7/2007 | Davi' et al. | 53/58 |
| 7,279,644 B1 | * | 10/2007 | Kasel | 177/25.13 |
| 7,775,373 B2 | * | 8/2010 | Grundtvig et al. | 209/542 |

FOREIGN PATENT DOCUMENTS

| | | |
|---|---|---|
| DE | 8437028 | 5/1985 |
| RU | 9432 U1 | 3/1999 |
| RU | 2170195 C2 | 7/2001 |
| WO | 8302002 | 6/1983 |

* cited by examiner

*Primary Examiner* — Christopher Harmon
(74) *Attorney, Agent, or Firm* — Daniel G. Stoddard; Bret E. Field; Bozicevic, Field & Francis, LLP

(57) ABSTRACT

The present invention relates to a device for packaging at least two products with individual weights in a package in a quantity corresponding to a target weight. The device comprises a feed, packaging means, weighing means (9) and throughfeed means. The device further comprises at least two adding means with associated weighing means (17) in a weighing unit (14) for the purpose of selectively adding unrelated products or groups thereof to the packaging, and with selection and control means for selecting at least one of the at least two unrelated products or groups on the basis of the weight of the initial group, the target weight and the weights of the at least two unrelated products or groups determined with the weighing means (17) associated with the adding means for the purpose of actuating the adding means in order to add at least one selected of the at least two unrelated products or groups thereof to the packaging. The device is distinguished in that the at least two adding means with associated weighing means are oriented in a set adjacently of each other in a direction transversely of the throughfeed path at a single position of the packaging in the throughfeed path thereof.

16 Claims, 7 Drawing Sheets

DEVICE FOR PACKAGING PRODUCTS

Figure 1:
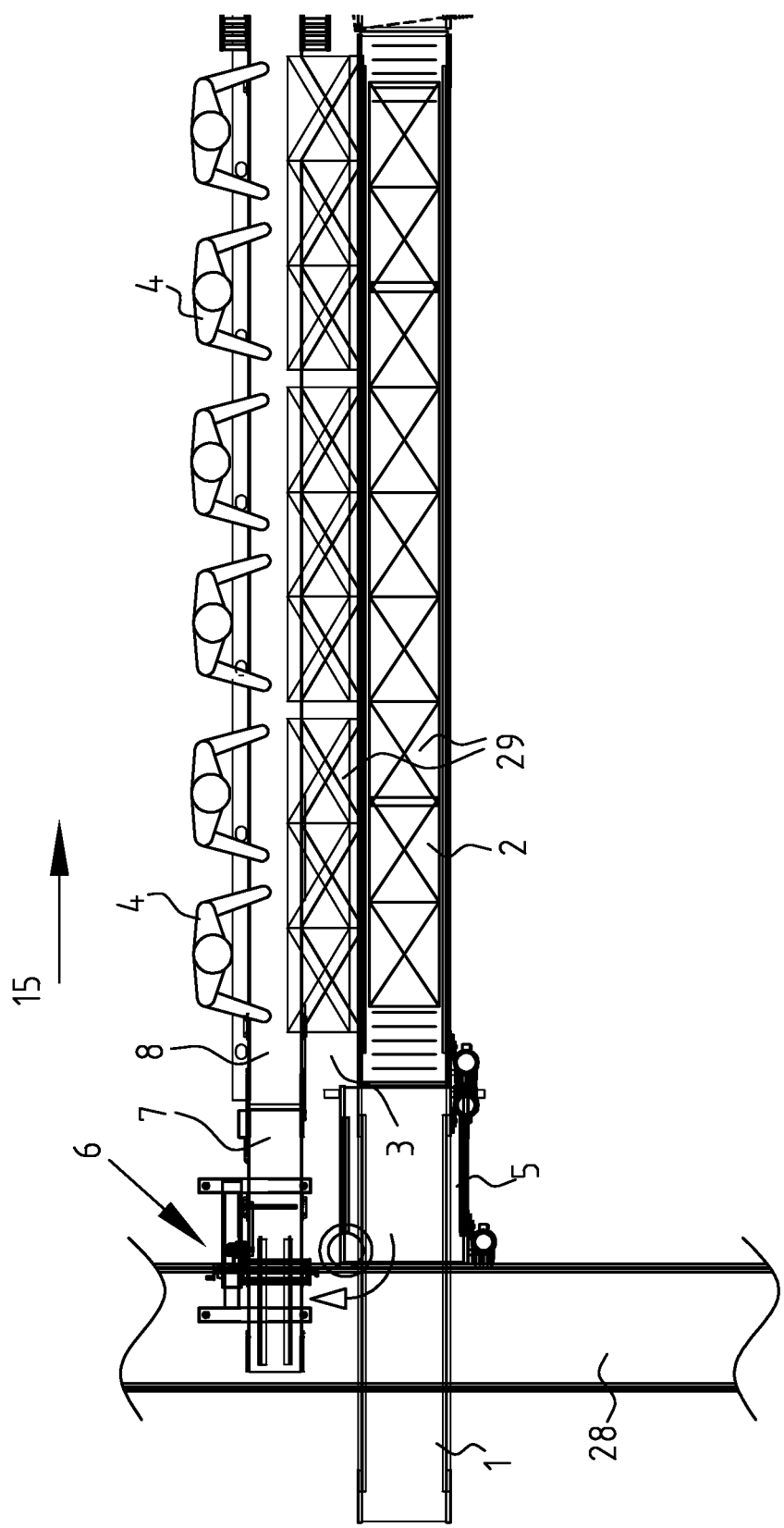

The present invention relates to a device for packaging products, in particular (though not exclusively) natural products such as soft or vulnerable vegetables, for instance mushrooms; fruits, for instance blackberries, strawberries or berries; and other fruit, for instance tomatoes, vine tomatoes, grapes and so on.

Diverse ways are known of filling trays forming packages with such products. These have the common drawback that the filling seldom results in a pre-desired target weight, and that this target weight is not structurally achieved within a chosen tolerance but only occasionally, i.e. by accident.

It is thus known in a device according to the preamble of main claim number 1 to arrange adding means with associated weighing means along the throughfeed at mutual intermediate distances equal to distances between the trays or other packages. When a packaging with initially at least one product therein or thereon arrives at the adding means, the weight thereof is determined using the first weighing means. A comparison is then made between the weighed weight of the presented packaging and the previously selected, set or determined target weight for the packaging. It is possible here to take into account the different adding means, which each comprise a group of at least one product to be added, and thus the weight available in each of the adding means of the products which can be added to the packaging in order to reach the target weight. Cases are possible where products are necessary in, on or at more than one of the adding means for the purpose of bringing one packaging to the target weight, or doing this sufficiently accurately. The operation of the known device is then such that the packaging is displaced on or over the throughfeed means to the selection of individual adding means and, upon arrival of the packaging, the products are added from the relevant adding means to the packaging. The content of a selected adding means thus remains "reserved" for a relevant packaging until this latter has arrived at the selected adding means and the product (or the group thereof) is transferred from the adding means to the packaging. Only then can the selected adding means be provided once again with a new product (or a group thereof) and is this specific adding means available to supply a supplement for the purpose of bringing a packaging with products to a target weight. During this time a smaller number of the adding means is thus available to supply such a supplement for a subsequent packaging. It hereby becomes apparent that, with a smaller collection from which a supplement or addition for a subsequent packaging can be chosen, there is also less chance of one of the adding means containing a product suitable for bringing a subsequent packaging to an intended target weight. An obvious solution could then be to apply a larger number of adding means in an array along the throughfeed means.

The present invention has for its object however to obviate, or at least alleviate, the problems of the known art, for which purpose a device according to the present invention is distinguished from the known art by the combination of measures in the main claim, in particular the characterizing features.

In a device according to the invention the time for which each of the selected adding means in any case on average remains reserved for a passing packaging can then be reduced considerably. In addition, a significant reduction in size of the weighing unit in such a device can be realized, at least in the direction along the throughfeed path. The accuracy with which the target weight can be achieved for each packaging can be increased without having to provide a longer weighing unit extending along the throughfeed path. The compactness of the weighing unit which can thus be realized affects the size of the whole device, and thus also the complexity and sturdiness thereof, as well as the costs thereof.

Diverse embodiments are possible within the scope of the invention as defined in the independent claim, this being shown in non-limitative manner in the dependent claims and the specific description of a possible embodiment hereinbelow.

A device according to the invention can thus have the feature of at least one additional set adjacently of or opposite the set relative to the throughfeed path. The compactness can hereby be increased still further and the device can be optimized still further.

In another embodiment the device has the feature that the adding means for actuating the selected of the at least two unrelated products or groups are oriented toward at least one conveyor, which is disposed at the side of the throughfeed means and runs parallel thereto and uniformly therewith. It is hereby possible to transfer the products from the adding means onto or into the separate conveyor in order to transfer the products, using a device (such as a robot arm or the like) or manually, from the conveyor into the packages in or on the throughfeed means. Damage to the products can thus be limited or even minimized. It can be advantageous here if products in or on the conveyor are transferred manually into the packages in order to limit damage to a minimum, this surprisingly running counter to the desire for further automation which has then already been partly fulfilled by the weighing unit, which can then at least bring about accurate filling to the target weight.

In a further embodiment a device according to the invention can then have the feature that the throughfeed means with the weighing unit form a corridor over a distance corresponding with a number of packages, with more adding means over this distance than the number of packages. An even more compact configuration is thus possible, which may also be suitable for a modular construction and easy maintenance and interchangeability.

The device according to the invention can then have the further feature that the weighing unit comprises twenty-four adding means. This is a number with a relation to weight distribution in the products to be added to the packaging with the adding means which can provide sufficient accuracy for most of the intended applications.

The device according to the invention can further also have the feature that the adding means are of a hand-fillable type. Surprisingly, this also runs counter to the concept of more and further-reaching automation, while the core of the device with, among other parts, the weighing unit is fully automated.

The device according to the invention can then also have the further feature that the weighing unit comprises a multi-head or linear weigher. This is basically a highly suitable apparatus for utilization according to the invention, provided it then has the structural properties according to this invention.

Operation with a device according to the invention can take place in various ways, for instance by at least partially filling the packaging and then selecting specific units of the products in order to achieve the target weight in each packaging.

Operation can take place according to diverse preferred embodiments. It is possible for a step of selecting to comprise of: setting the target weight as lower limit. Buyers are thus not confronted with a packaging with slightly fewer products than they expected to purchase.

It can then be further the case that the step of selecting comprises of: setting an upper limit at the level of the target weight increased by a percentage thereof. Excessive filling, at least without payment therefor, can thus be prevented. It is possible here for the tolerance to amount to a percentage of 10%, preferably 5% and more preferably 3%. According to the invention the degree of accuracy can hardly be influenced by factors other than by the individual distribution by weight of the products, and the number of products from which it is possible to select in order to supplement the already present filling of a packaging. Increasing this number may result in a higher accuracy as well as in a lower individual distribution. In the case that no individual product complies with the upper limit, it is possible here that the method further comprises the step of waiting until an individual product becomes available with which it is possible to comply with the upper limit. A delay can thus be accepted in order to still be able to satisfy the desired accuracy.

In another embodiment it is possible that the products are vulnerable, such as vegetables, fruits and other fruit, for instance grapes or tomatoes, where the method further comprises of: providing a multihead or linear weigher and manually placing products in separate weighing pans of the weigher. This is at variance with the usual manner in which linear weighers are normally applied, i.e. in fully automated systems and methods. It is possible here that the weigher comprises at least two weighing devices, each with a weighing pan and a weighing unit. The higher the number of weighing devices, the more accurately the method and device will be able to approach the target weight, depending on the individual distribution of the weight of the products. The compactness which can be achieved according to the invention provides for a highly accurate filling of the packages and a high throughput speed. It is then further also possible for the method to comprise of: interrupting the operation of automatically functioning components and elements in anticipation of sufficient products becoming available in the weigher to enable the upper limit to be met with an acceptable degree of probability. A delay is also acceptable here in respect of the desired accuracy relative to a set target weight.

FIGS. 1-7 show a succession of parts and components which together form a packaging line 15 in which the method and device according to the invention are realized, in particular by a weighing unit 14.

Conveyor belt 1 has dimensions of for instance L×W=2,500×500 mm. Conveyor belt 1 is provided with belt type S, lateral guiding and support legs (not shown). A non-driven roller track 2, for instance with dimensions L×W=6,000×500 mm, is disposed along conveyor belt 1. The plastic rollers in roller track 2 have a diameter of 50 mm and a centre-to-centre distance of 83.3 mm.

Operatives 4 sit or stand at conveyor belt 3, for instance with dimensions L×W=1,750×450 mm. Conveyor belt 3 is for instance provided with belt type S, lateral guiding and support legs (not shown). Further arranged back at belt 1 is a conveyor belt 5, for instance with dimensions L×W=1,000×700 mm. This conveyor belt 5 is provided with belt type S, lateral guiding, support legs and a reversing wheel (not shown). Crates 29 with products therein are fed over conveyor 28 and empty crates 29 are also discharged thereover. Different configurations are possible other than that shown in FIG. 1 and described above.

Disposed at the feed is a double de-nester 6. This connects onto a conveyor belt 7, for instance with dimensions L×W=1,500×300 mm, which conveyor belt 7 is provided with belt type S, lateral guiding, support legs and swivel wheels (not shown). Conveyor belt 7 then connects in turn to a conveyor belt 8, for instance having per se dimensions L×W=7,500×300 mm. This conveyor belt 8 is provided with belt type S, adjustable lateral guiding and support legs (not shown), and operatives 4 sit or stand at or by it. These operatives 4 ensure pre-filling of trays forming packages, which are taken from a stack and singulated by de-nester 6. The pre-filling effected by operatives 4 is for instance and preferably about 70% of the final target weight. In order to prevent overloading of a weighing unit to be further described hereinbelow when the filling of the packages or trays begins to require too many products due to too low a pre-filling weight, trays or packages with a pre-filling weight lower than for instance 70% of the final target weight can be fed back via a return system to operatives 4 for extra pre-filling.

Figure 2:
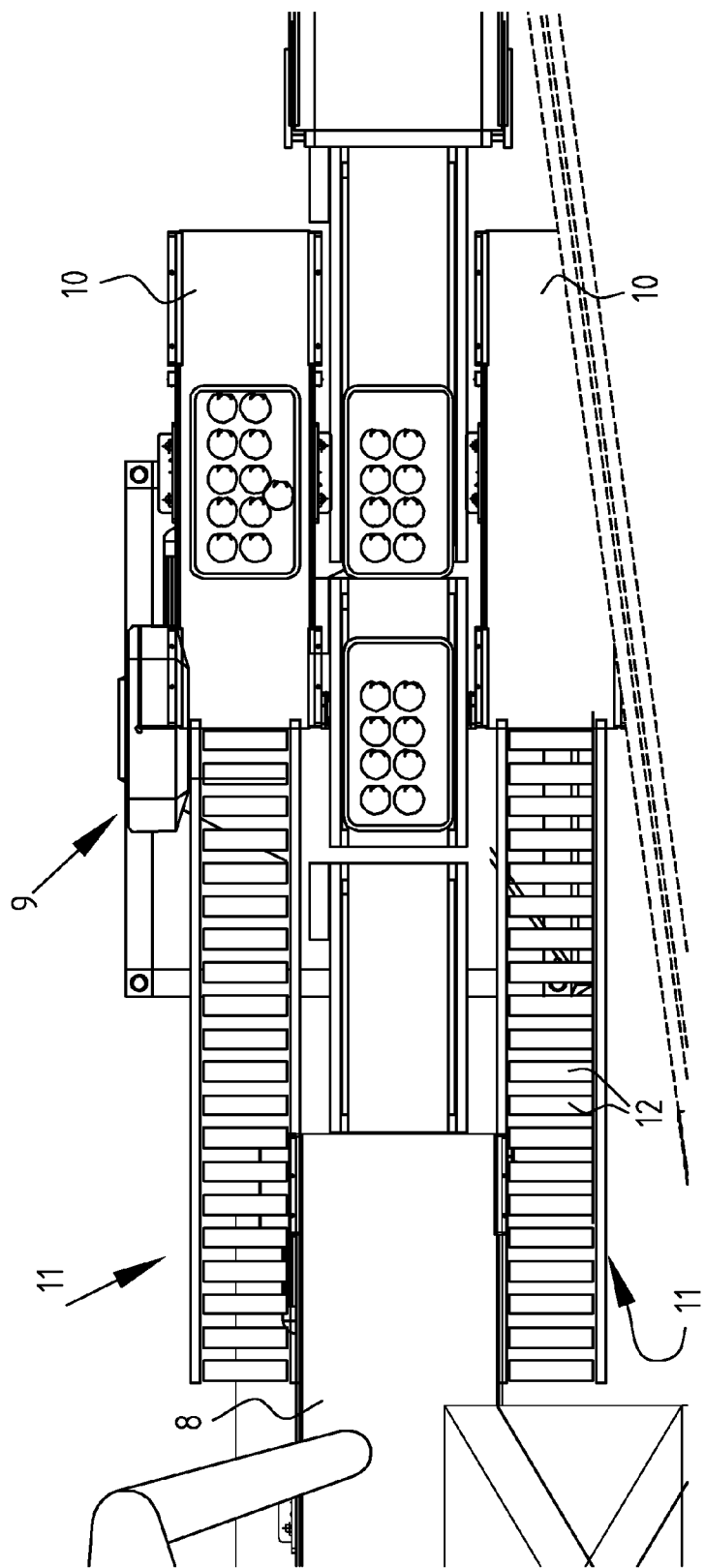

Placed between conveyor belt 3 and conveyor belt 8 is a check weigher 9, as shown in FIG. 2. This weigher is provided with a double-action rejection or return system for feeding packages with insufficient pre-filling back to operatives 4.

Placed on either side of check weigher 9 are two selectively driven conveyor belts 10, for instance with dimensions L×W=750×300 mm. Conveyor belts 10 are provided with a belt of belt type S, lateral guiding and support legs (not shown). To the side of check weigher 9 two non-driven roller tracks 11 are also placed in line with conveyor belts 10. Roller tracks 11 have for instance dimensions L×W=1,000×300 mm. Plastic rollers 12 of roller tracks 11 have a diameter of 20 mm and a centre-to-centre distance of 25 mm. Roller tracks 11 are provided with fixed lateral guiding and adjustable support legs (not shown). The assemblies of conveyor belt 10 and roller track 11 on each side of the check weigher each provide a possibility for the check weigher to feed a relevant tray back to a previous operative 4 as seen in the direction of movement of trays 16. This is what is meant by the statement that the check weigher comprises a double-action rejection system. A packaging (tray) with too low a pre-filling, this being determined by check weigher 9, is rejected and not fed through to the sub-configuration of FIG. 3, indicated in FIG. 2 with arrow III. The weights of the packages which are allowed through are stored in a memory and are retrieved when the packaging arrives at a weighing unit, to be further described hereinbelow, in order to be able to effect the correct addition of products at that position on the basis of products available in the weighing unit at that moment.

Figure 3:
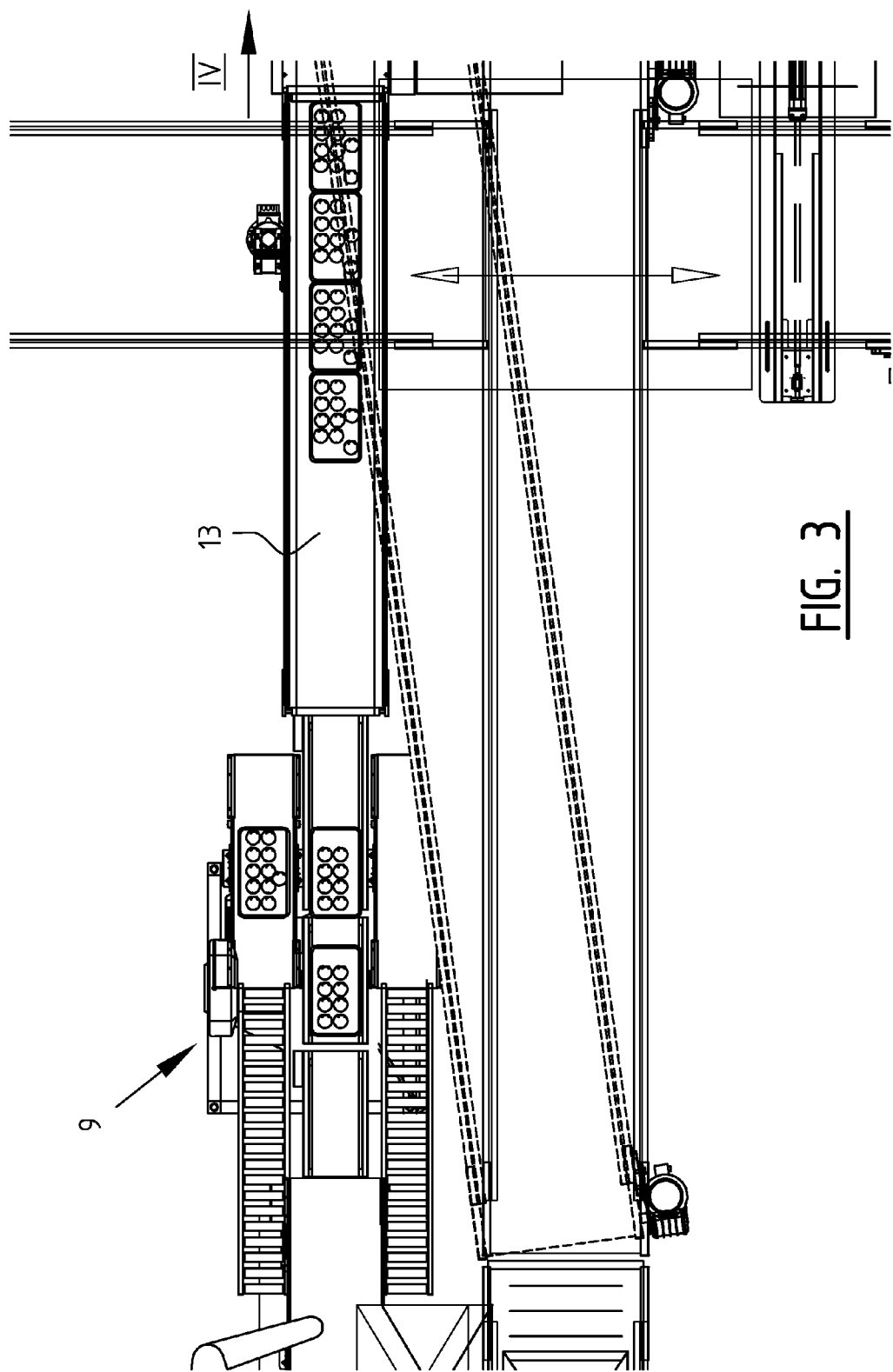

Arranged connecting to check weigher 9 is a so-called flow packer 13, which is shown in FIG. 3. This can be provided with an inline feeder and a printer. Flow packer 13 does not close the packages as yet.

Figure 4:
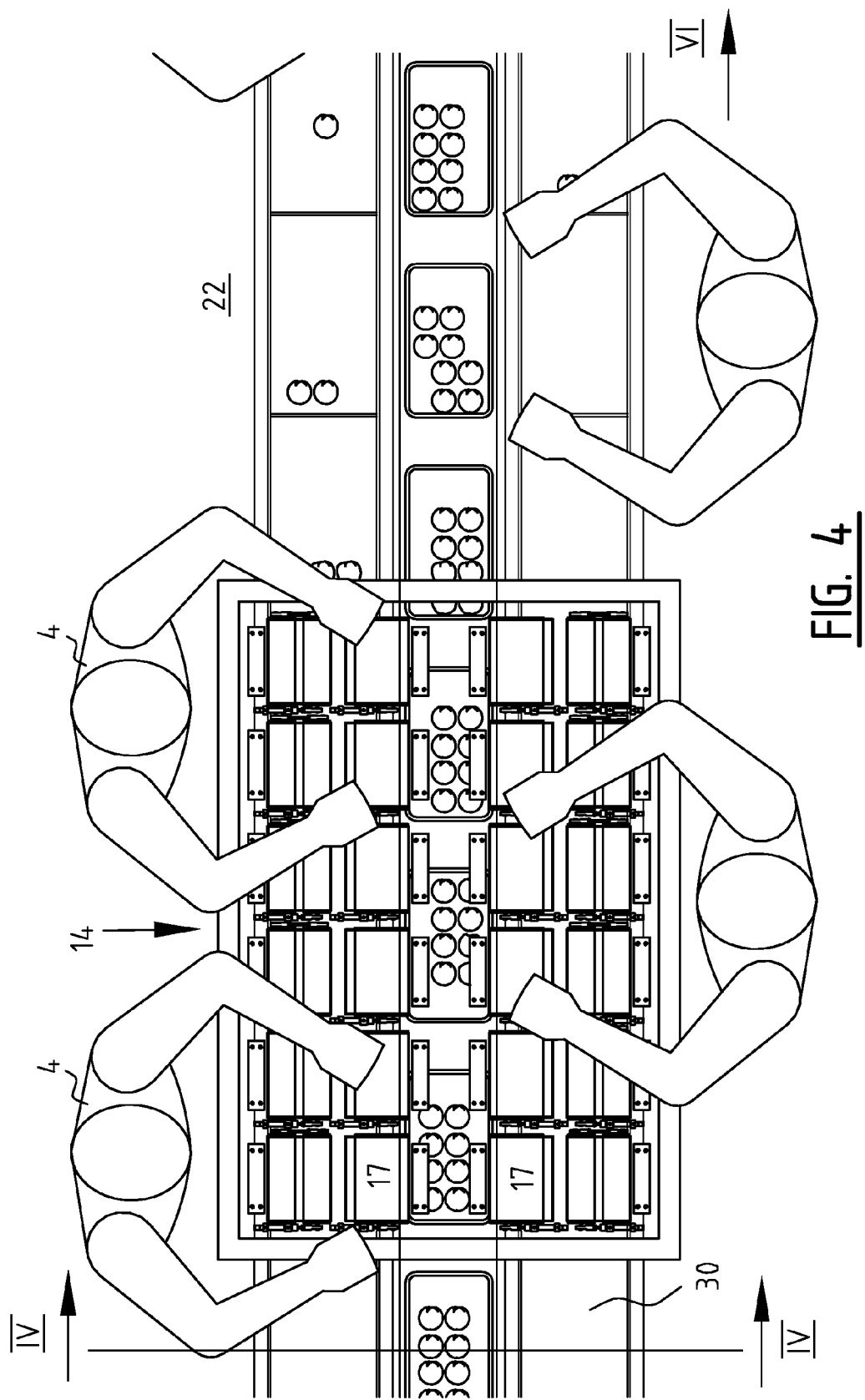
Figure 5:
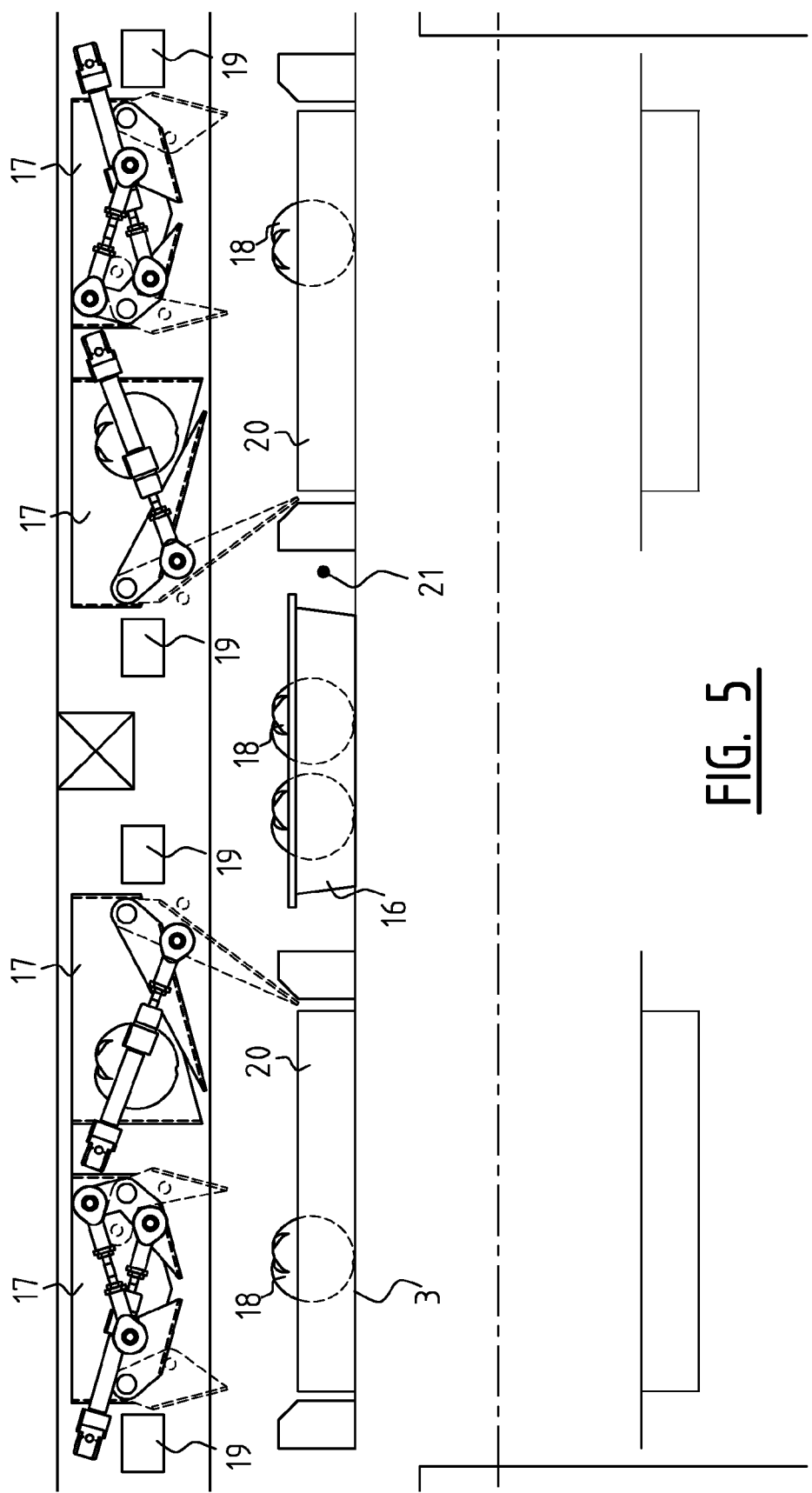

Disposed behind flow packer 13 in the direction of flow is a weighing unit 14 for the purpose of correctly filling up the trays 16 delivered thereto. Weighing unit 14 is provided with twenty-four scales 17, which are each associated with a related load cell 19. In FIG. 4 tomatoes are manually placed in or on scales 17 by operatives 4. FIG. 5 shows a cross-sectional side view along line V-V in FIG. 4. Shown herein is a tray 16 partially filled with tomatoes 18, flanked by rows of scales 17 with associated weighing cells or load cells 19, and wherein scales 17 are filled manually and carefully by operatives 4. The bottoms of scales 17 can be selectively opened in order to allow the tomatoes therein to drop a very short distance into containers 20 on or at belts 30 on either side of central passage 21. Operatives 4 on exit side 22 of weighing unit 14 in FIGS. 4 and 6 place tomatoes 18, which have been placed in containers 20 from scales 17, on belts 30 with the tomatoes 18 already present in trays 16. Alternatively, scales 17 can be adapted to deposit tomatoes 18 directly into trays 16, although possibly occurring collisions can then cause damage to the tomatoes. The use of robot arms instead of operatives 4 can also be considered if they can avoid or prevent contact with tomatoes 18 already lying in trays 16, for instance using a vision system, although this may have consequences in respect of (non-)susceptibility to disruption and the cost of the device, in particular weighing unit 14.

FIG. 5 clearly shows that no fewer than 4 scales correspond with one position of a tray 16 to which products (here tomatoes 18) must be added. Scales 17, which are thus associated with one such position, form part of a set extending transversely of central passage 21 and the direction of movement of trays 16.

Figure 6:
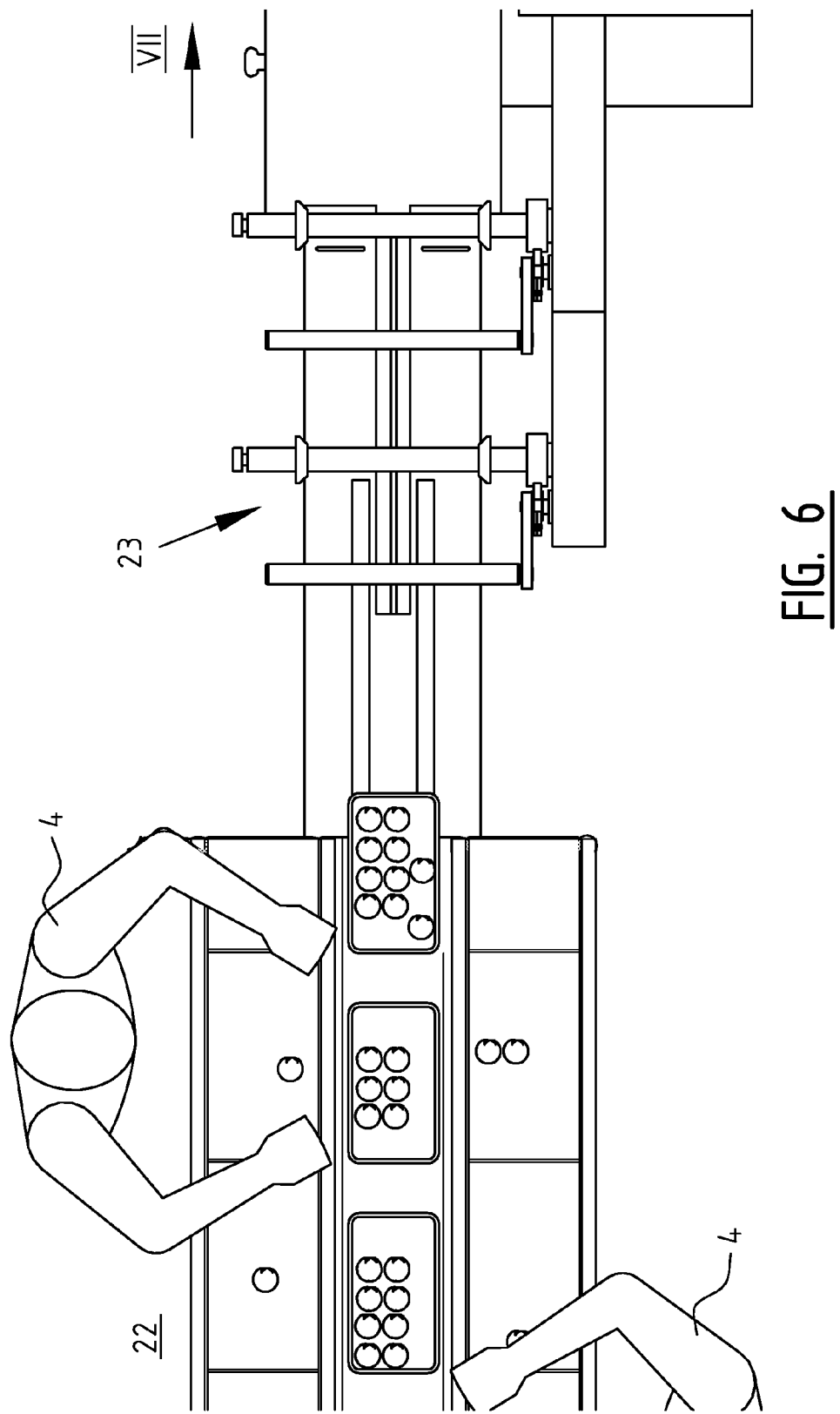
Figure 7:
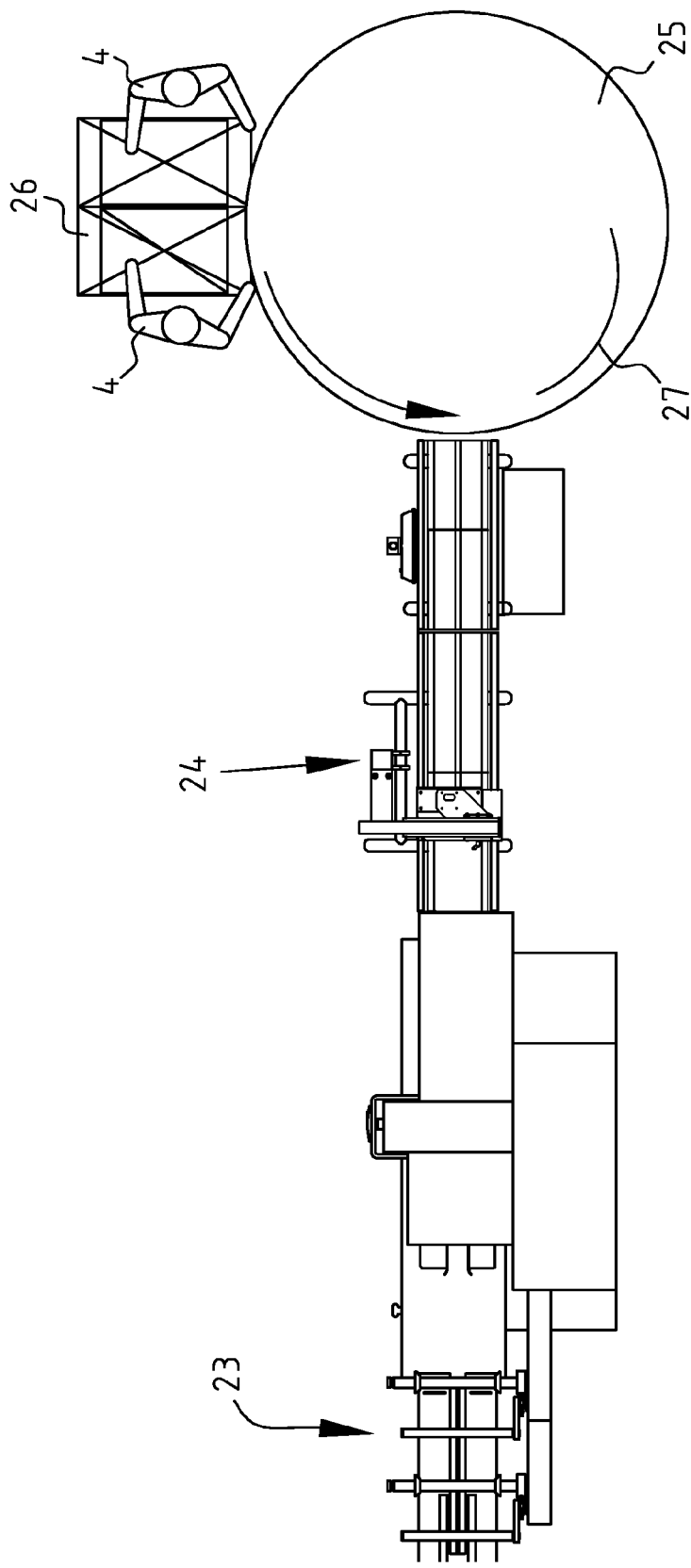

Trays 16 are then fed through to a closing station 23 in FIGS. 6 and 7, and then carried through to a price/weight-labelling system 24 in FIG. 7, from where the enclosed and labelled trays 16 are carried to a turntable 25 for removal by further operatives 4 and prepared for discharge on a double worktable 26. Trays 16 are for instance packed in boxes or crates 29 or the like at the double worktable.

The turntable can be provided with artificial grass covering (not shown) and can comprise a guide arm 27 for the purpose of carrying the packaged trays 16 toward the inner part of the tabletop of turntable 25.

The object of the method and of the system is, using the fewest possible people, to nevertheless manually provide the final packaging (=plastic or cardboard tray 16) with tomatoes 18 or other vegetables or fruits and to seek the missing weight by means of the 24-head weighing unit 14, whereby the weight of the packaging will be as close as possible to the set target weight. The object is also to make weighing unit 14 as compact as possible and to make the efficiency thereof as high as possible. By making the elongate nature of weighing unit 14 as short as possible, scales 17 also remain reserved for less time than would be the case in a configuration with one filling station per position of a tray 16 in the throughfeed direction.

Some excess weight is sometimes allowable in practice. Short weight is usually not. Even if there is some excess weight, for the majority of all possible applications this excess weight may however be no higher than a percentage of 10% of the target weight, although preferably no higher than 5%, and more preferably no higher than 3%. In addition, the line through packaging device 15 is given a form such that there are or occur the fewest possible transitions or points susceptible to disruption where something can go wrong. In addition to the highest possible accuracy in respect of the weight supplied per tray 16, a high capacity can thus also be realized. This line is also suitable for practically all commercially available retail packages with a maximum width of 200 mm, although this depends on chosen dimensions, and these could equally well be designed/chosen other than stated, for instance for different fruits, other fruit and vegetables, without departing from the scope of the invention.

In a possible embodiment, for instance as shown in the figures, the capacity of a packaging line 15 is about 80 final packages per minute in a continuous and uniform production process. The speed of line 15 can however be adapted to a capacity of 100 trays per minute, or also a lower capacity.

This weighing unit 14 is based on the principle of a multi-head weigher or linear weigher, though with a plurality of filling scales 17 per position of each tray. The product 18 for weighing is manually placed in weighing pans 17, and placed in the trays from containers 20. Another notable aspect of the invention is that trays 16 are already partially filled with products 18 when they arrive at weighing unit 14, whereby this weighing unit 14 will only top up the missing weight. In the context of the invention this weighing unit 14 is highly suitable for use in combination with sensitive products, such as soft fruit, vine tomatoes, grapes, mushrooms and so on.

Once the packages or trays 16 have been manually pre-filled in the part-setup shown in FIG. 1, they are weighed by check weigher 9 shown in FIG. 2. Trays 16, with a weight which must in any case not be too high but not too low either, are fed through to the infeed conveyor of flow packer 13. Conversely, trays 16 with short and excess weight are pushed over by means of a push-over system to one of the two discharge conveyors 10, 11, back along the throughfeed to the infeed conveyor or central passage 21 of weighing unit 14 and to the final "feeder" 4. The correct weights, i.e. of trays 16 allowed through to flow packer 13, are stored in a register in order to be retrieved later by the weighing unit 14. The weighing unit there has the opportunity to deposit any conceivable combination of twenty-four products 18 in scales 17 in containers 20 so as to allow this combination of products to be added to the already present content of trays 16 in order to thus exceed the target weight as little as possible.

The limits of the target weight, short and excess weight can be communicated once again at each batch change, for instance in the case that different products are going to be packaged, whereby the settings in check weigher 9, if necessary, can be automatically adjusted or entered. Use can be made for this purpose of a so-called SCADA system.

The SCADA system will also show the target weights for the "feeders" by means of a display, so that they know roughly how much weight they must place in trays 16 (in numbers of tomatoes and assuming a uniform average weight per tomato 18). This display shows a number which represents the number of tomatoes 18 which must be placed in the final packaging or trays 16 in order to pre-fill these trays. Already stated above is a lower limit of the pre-filling of 70% of the final target weight, although it will be apparent that a different percentage can be chosen depending on the products and the average weight thereof per product. The SCADA system knows the average product weight of each batch. It is also possible for the tomatoes 18 in containers 20 to co-displace with trays 16 to feeders 4 behind weighing unit 14, so that these feeders can place tomatoes 18 carefully alongside the tomatoes 18 already present in trays 16.

The twenty-four scales 17 of weighing unit 14 can be filled manually for instance in ones (one tomato), in twos (separately or a vine with two tomatoes) and threes (separately or a vine with 3 tomatoes).

Many additional and alternative options will occur to the skilled person after examination of the foregoing description of the embodiment(s) of the invention shown in the figures, which must all be seen as embodiments of the invention as it is defined in the claims, unless such options depart from the letter or spirit of these claims. As now known, weighing pans 17 of weighing unit 14 will be filled by means of three persons 4, who will each fill eight weighing pans 17. Space can however also be provided for four persons. If trays 16 with tomatoes 18 are fed in on the index track of the flow packer, the weight of this final packaging will be retrieved from the register of the check weigher and the 24-head weighing unit 14 will determine which weighing pans 17 will be opened in order to arrive as closely as possible at, and preferably not much higher than, the set target weight. The tomatoes situated in the selected weighing cells are reserved for the tray for a short time, during which this tray 16 moves toward a relevant weighing pan 17. Upon arrival of tray 16 at one of the relevant weighing pans 17, the content of the weighing pan is emptied into a compartment conveyor 20 situated parallel to the flow packer. For various reasons (mainly drop height), there are two compartment conveyors, i.e. one on the left-hand side and one on the right-hand side of the index track of the flow packer. The three conveyors all have exactly the same speed. For this purpose a single drive or different drives can be provided for throughfeed 21 of flow packer 13 and conveyors 30 with containers 20. This is the drive of index track 21 of the flow packer, which runs through the weighing unit.

Compartment conveyors 30 with containers 20 have a compartment width of about 38 cm, which corresponds with the centre-to-centre distance of the carriers on the index track of the flow packer. The tomatoes emptied onto compartment conveyors 30 by the 24-head weighing unit 14 then correspond with the final packaging situated on the index track of the flow packer. The two persons standing behind weighing unit 14 can now easily transfer the tomatoes from compartment conveyors 30 into final packaging 16 on the index track. Each person 4 is responsible for one compartment conveyor. The trays 16 or final packages are then fed into the final part of flow packer 13 and are then provided with a foil.

It is possible with the invention to satisfy a wide-ranging set of wishes, although these wishes are not requirements within the scope of the invention. It may thus be desirable for there to be only one "one" in a final packaging. There should however be a selection switch to give the system the option of topping up to a maximum of two ones, and then no situations will occur with three ones.

The drop height must be as low as possible in order to prevent damage to the product and to prevent the tomatoes from breaking off the vine. On the other hand, the invention can be realized in an embodiment wherein the products from weighing pans 17 are deposited directly into packages 16.

If flow packer 13 stops for whatever reason, the part preceding it will also stop automatically. If the feed of trays comes to a halt or varies in speed for whatever reason, the accumulation on the infeed conveyor will determine the speed of flow packer 13 or the flow packer will stop. The 24-head weigher will therefore have to take account of the varying speeds.

Weighing unit 14 must also stop automatically if too few weighing pans are filled, since there are otherwise too few possible options.

No information will need to be sent from a control system, such as SCADA, to the 24-head weigher. In many embodiments of the invention this control system will indicate the correct program menu to the check weigher for each new batch. It must however preferably be possible to control check weigher 9 manually. Both check weigher 9 and 24-head weighing unit 14 must communicate each weighing to the control system.

The height of the 24-head weigher can be adjusted manually or automatically. This is even possible in accordance with the size of the products for packaging. Spindles or the like are then preferably not applied however, although no tool will be necessary either to realize this. A minimum height is provided for such that weighing pan 17 is positioned just above the carrier or container 20 of discharge conveyors 3, and the maximum height can then be equal to for instance the minimum height plus 20 centimeters. The system must however be safeguarded such that the weighing pans can never be damaged if the height of the weighing unit is adjusted.

At the end of a batch of the same variety, the tomatoes may remain in the weighing pans. When there is for instance a change from fine to coarse, the weighing pans must be emptied in one operation.

The combination of check weigher 9 and 24-head weighing unit 14 must be easy to reset if an accident or unforeseen situation occurs in the path therebetween.

The 24-head weigher can be used in diverse ways, i.e.:

An attempt is already made to substantially achieve the target weight during the manual filling, whereby only one "one" or "two" is added. The advantage is that the people at the weighing unit can keep up easily. The drawback here is that the people at the start must take good care that no excess weight occurs, and the giveaway weight will not be optimal, although it is expected that it can still be kept below the limit of 3% of the target weight.

Alternatively, trays 16 can be initially filled in a way such that more scales 17 are always required to realize the target weight. An advantage hereof is that few people are required at the input side and an optimal target weight is achieved. A drawback is however that the people at the weighing unit become very busy, whereby the fourth person might occasionally be required.

The invention claimed is:

1. A device for packaging at least two products with individual weights in a package in a quantity corresponding to a target weight, comprising:
    a feed configured to provide at least one packaging at a time;
    a packager for arranging in the packaging an initial group of at least one product;
    a first weigher configured to weigh the initial group;
    a throughfeeder configured to transport the packaging with at least the initial group through the device along a throughfeed path; and
    a weighing unit configured for selectively adding unrelated products or groups thereof to the packaging, the weighing unit comprising first and second adders with an associated second weigher configured to weigh unrelated products or groups thereof within the first and second adders, and selection and control components for selecting at least one of the unrelated products or groups on the basis of the weight of the initial group, the target weight, and weights of the unrelated products or groups determined with the weighing unit for the purpose of actuating at least one of the adders in order to add at least one selected of the unrelated products or groups thereof to the packaging,
    wherein the first and second adders are oriented along the throughfeed path in a first set adjacent to each other in a direction transverse to the throughfeed path at a single position of the packaging in the throughfeed path thereof.

2. A device as claimed in claim 1, wherein the weighing unit further comprises third and fourth adders with an associated adders third weigher configured to weigh unrelated products or groups thereof within the third and fourth adders, wherein the third and fourth adders are oriented in a second set, and wherein the second set is arranged adjacent to or opposite of the first set relative to and along the throughfeed path.

3. A device as claimed in claim 1 or 2, wherein the adders are oriented over and toward at least one conveyor, which is disposed at the side of the throughfeeder and runs parallel alongside the throughfeeder and uniformly therewith.

4. A device as claimed in claim 3, wherein products in or on the conveyor are transferred manually into the packages.

5. A device as claimed in claim 1, wherein the throughfeeder with the weighing unit form a corridor over a distance and the device is configured such that packaging with at least the initial group travel through the corridor along the throughfeed path.

6. A device as claimed in claim 1, wherein the weighing unit comprises twenty-four adders.

7. A device as claimed in claim 1, wherein the adders are of a hand-fillable type.

8. A device as claimed in claim 1, wherein the weighing unit comprises a multihead or linear weigher.

9. A device as claimed in claim 1, wherein the through-feeder comprises a first conveyor, and wherein the device further comprises:
   a second conveyor, which is disposed at a first side of the first conveyor and runs parallel to and alongside the first conveyor; and
   a third conveyor, which is disposed at a second side of the first conveyor and runs parallel to and alongside the first conveyor.

10. A device as claimed in claim 9, wherein the first conveyor comprises a first conveyor belt, the second conveyor comprises a second conveyor belt, and the third conveyor comprises a third conveyor belt.

11. A device as claimed in claim 9, wherein the first, second and third conveyors are in a single plane.

12. A device as claimed in claim 1, wherein the first and second adders each comprise a pan configured to retain therein the unrelated products or groups thereof and the second weigher is configured to weigh the unrelated products or groups thereof retained in the pans.

13. A device as claimed in claim 1, wherein the adders comprise an openable bottom portion which when opened, allows the unrelated products or groups thereof to drop out of the openable bottom portion.

14. A device as claimed in claim 13, wherein the openable bottom portion comprises first and second doors which can each be selectively opened.

15. A device as claimed in claim 1, wherein the through-feed path is linear.

16. A device as claimed in claim 1, wherein the through-feeder is configured to transport the packaging with at least the initial group into the device.

\* \* \* \* \*